June 4, 1946.  G. M. DYE ET AL  2,401,623
FILM LOADING DEVICE
Filed Jan. 13, 1944  5 Sheets-Sheet 1
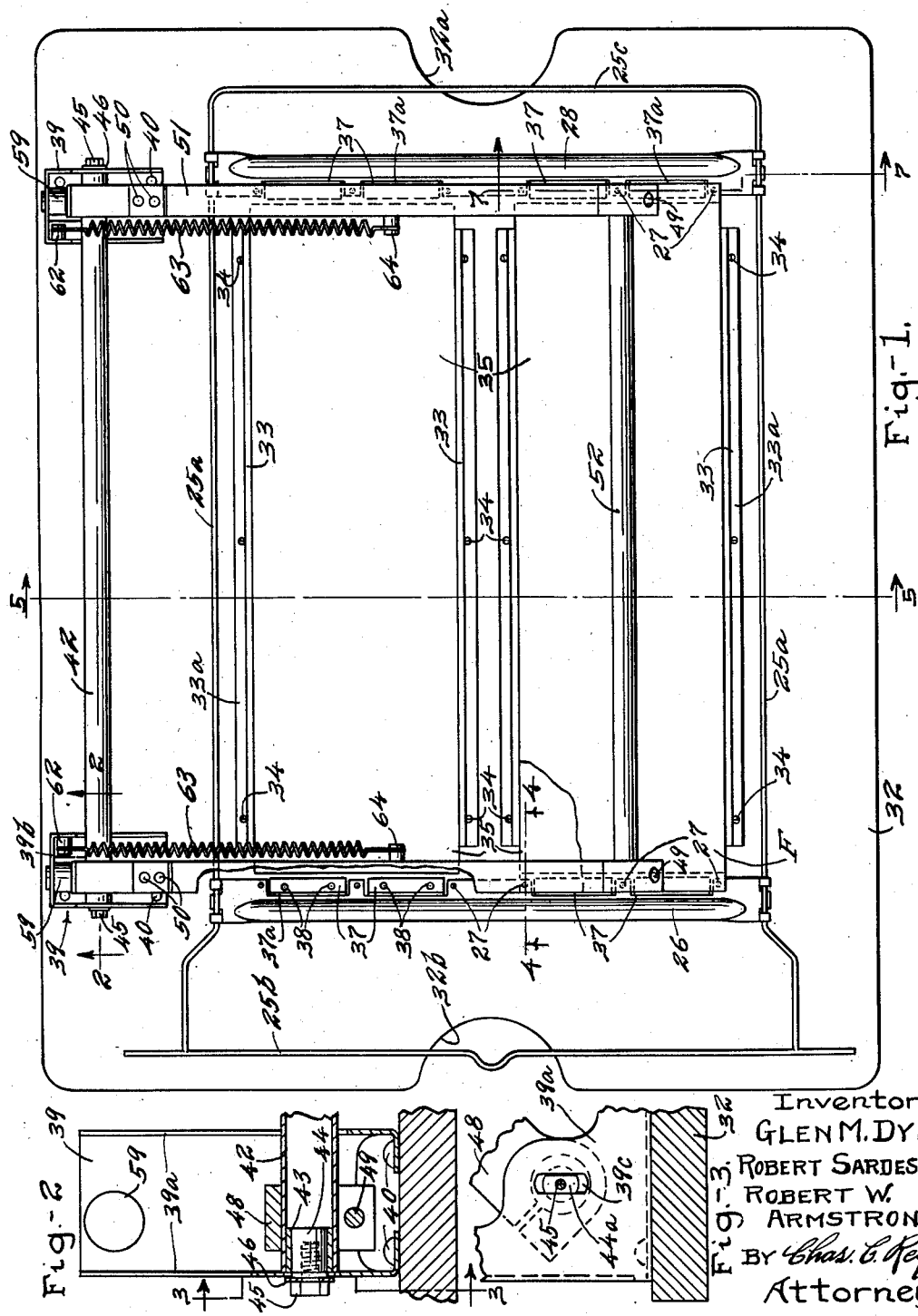
Inventors:
GLEN M. DYE
ROBERT SARDESON
ROBERT W. ARMSTRONG
By Chas. C. Reif
Attorney.

June 4, 1946. G. M. DYE ET AL 2,401,623
FILM LOADING DEVICE
Filed Jan. 13, 1944    5 Sheets-Sheet 2
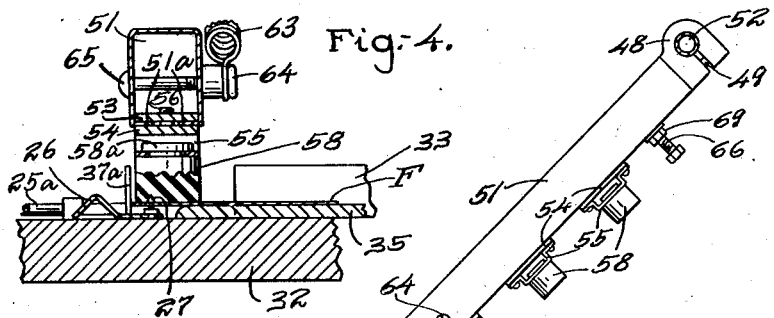
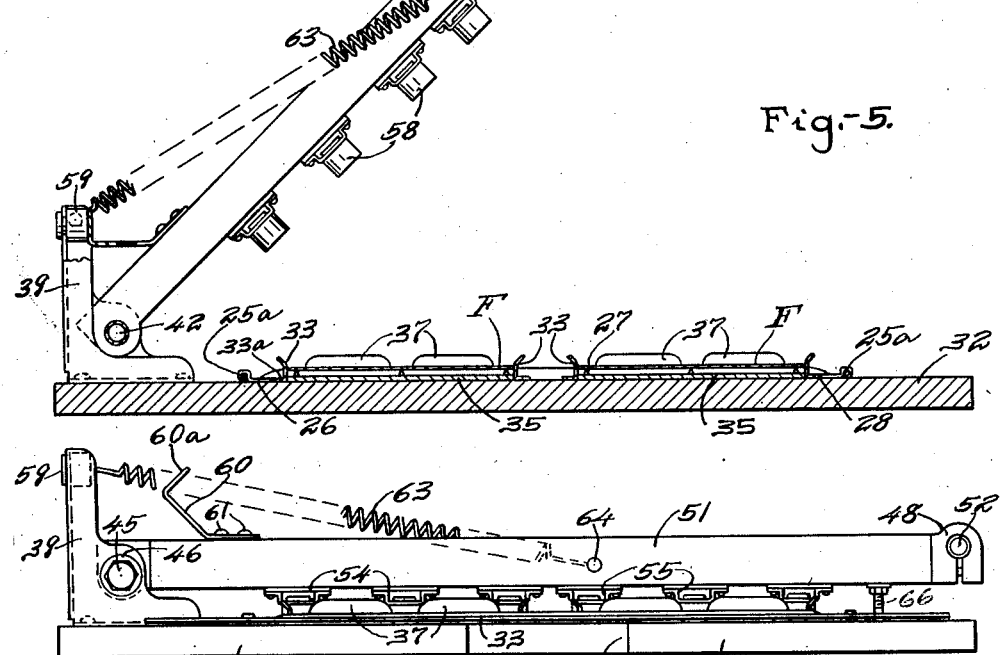
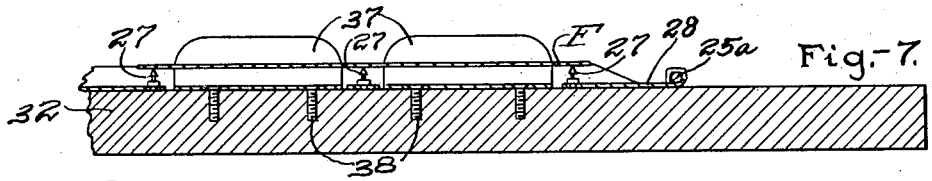
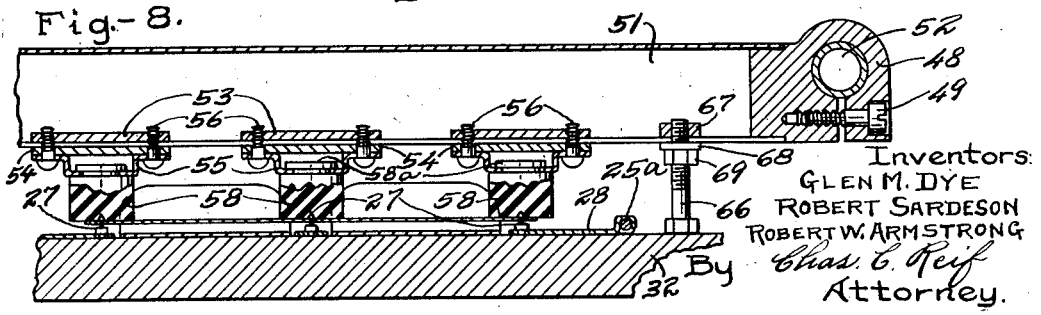
Inventors:
GLEN M. DYE
ROBERT SARDESON
ROBERT W. ARMSTRONG
By Chas. C. Reif
Attorney.

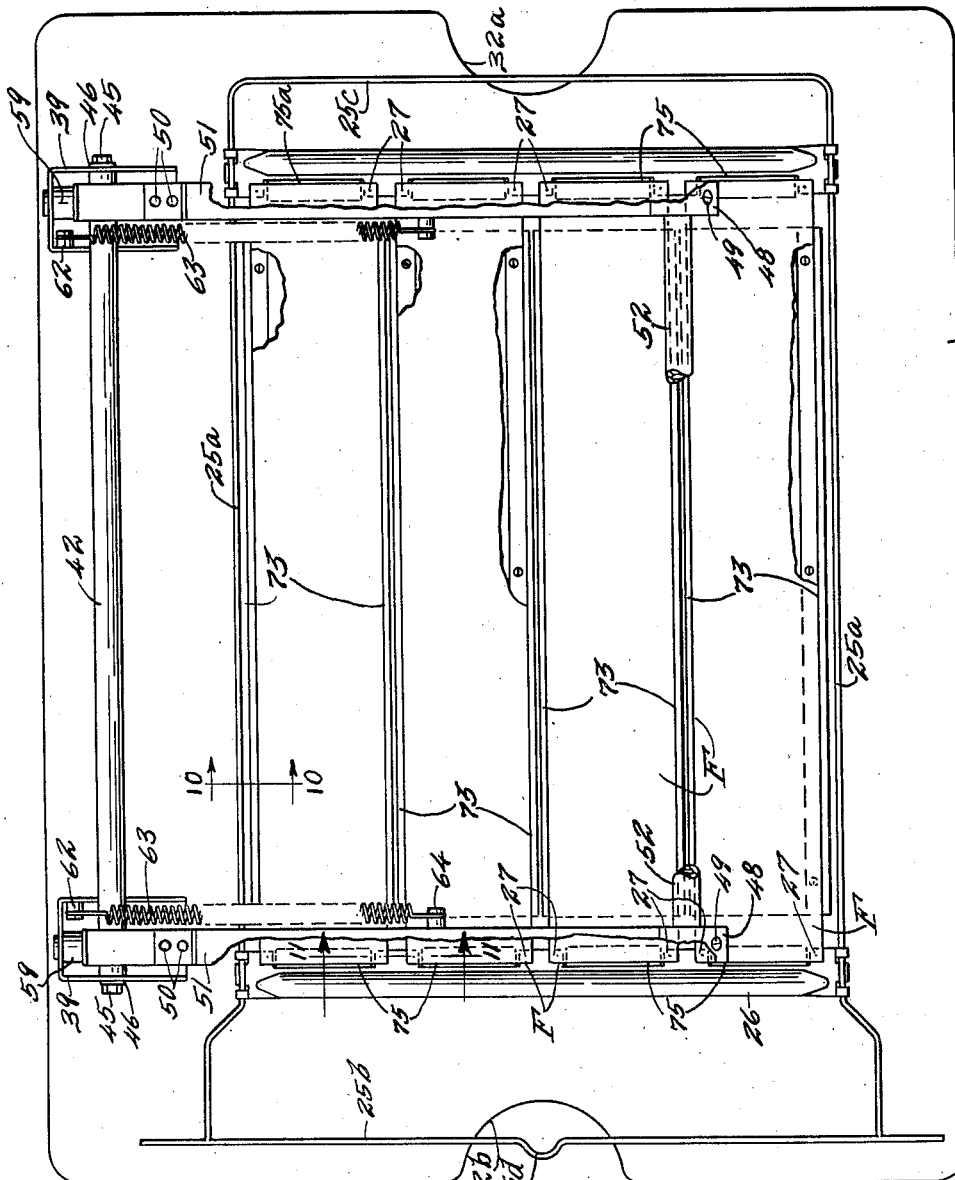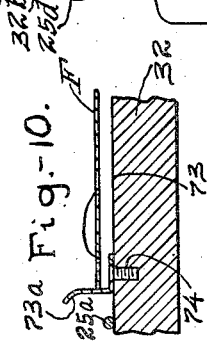

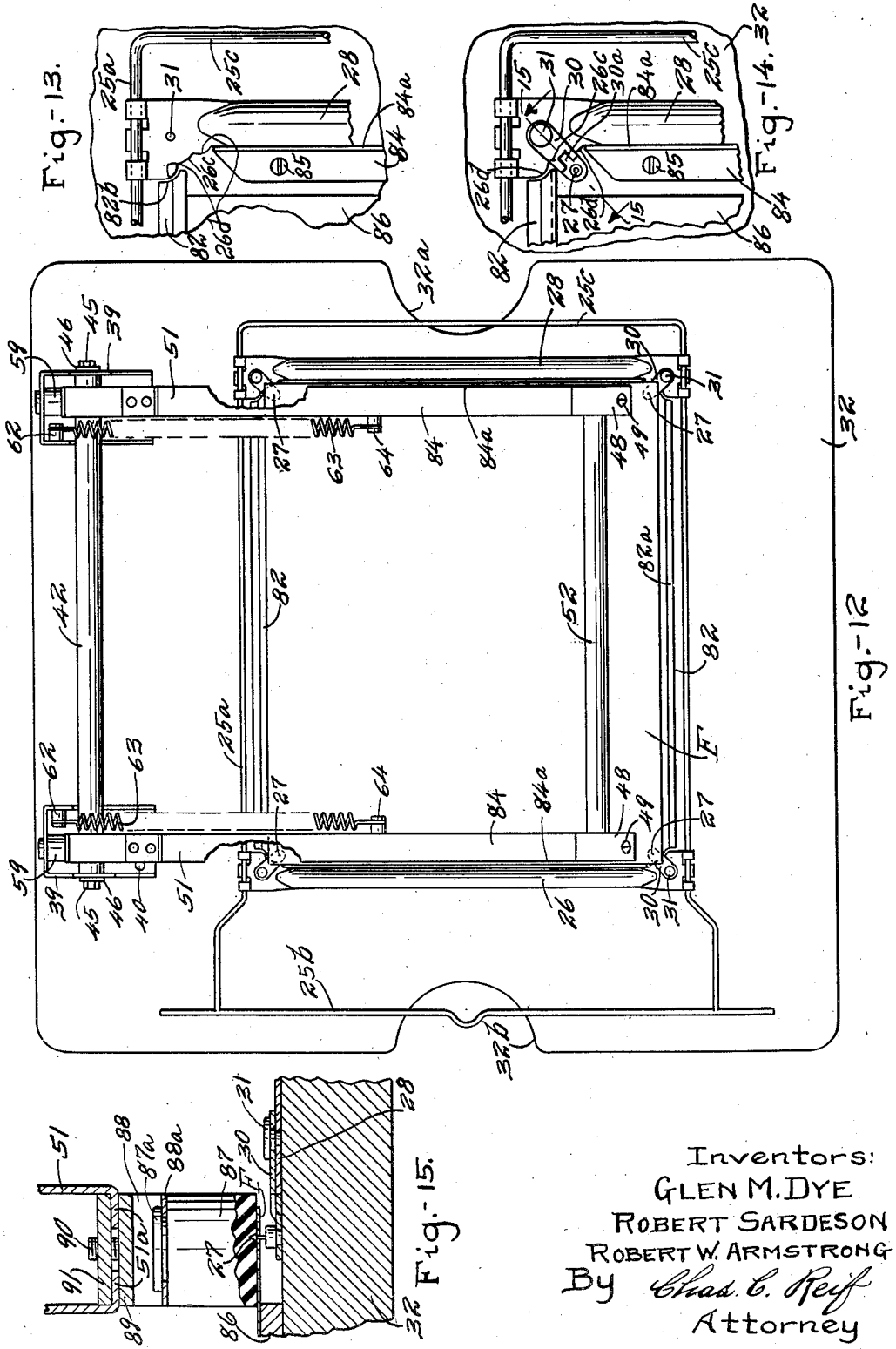

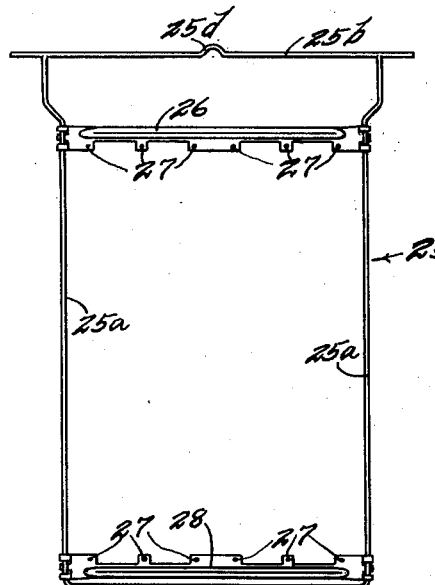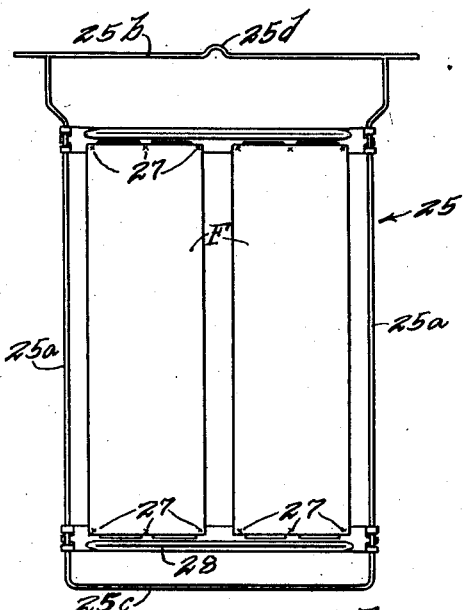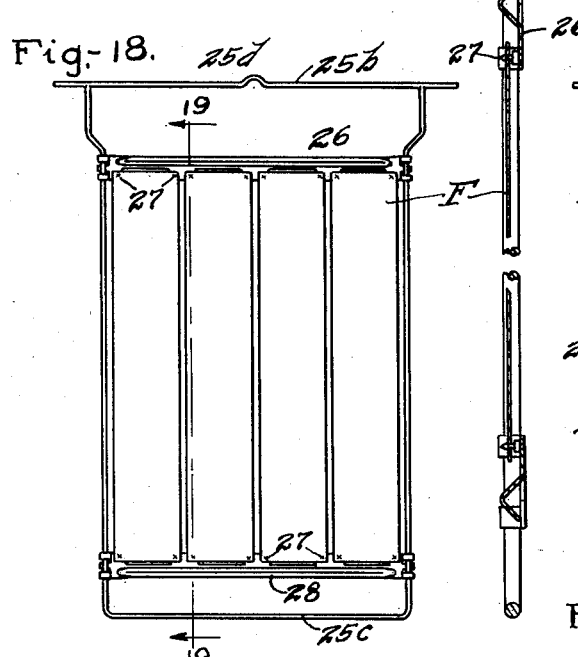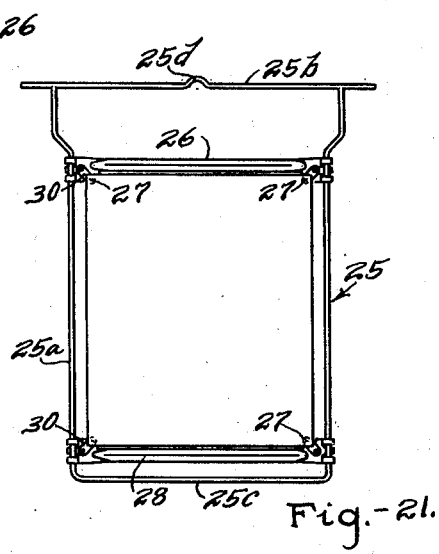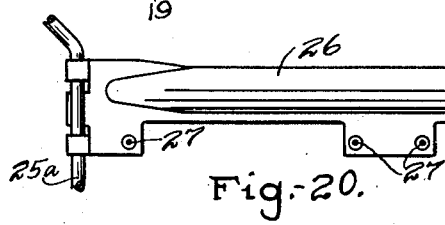

Patented June 4, 1946

2,401,623

UNITED STATES PATENT OFFICE 2,401,623

FILM LOADING DEVICE

Glen M. Dye, Robert Sardeson, and Robert W. Armstrong, Minneapolis, Minn., assignors to Pako Corporation, Minneapolis, Minn., a corporation of Delaware Application January 13, 1944, Serial No. 518,082

9 Claims. (Cl. 95—100)

This invention relates to a film loading device. Photographic films are now developed in large numbers and many of these films are placed on film holders or hangers by means of which they are disposed in or moved through the various processing solutions. This is particularly true of X-ray films which are now used in large numbers in industry. It is desirable to have a film holder or hanger to which the films can be easily and quickly attached and it is further desirable to have some means for quickly attaching the films to such a holder or hanger.

It is an object of this invention therefore to provide a device by means of which one or more films can be quickly and easily attached to a holder or hanger.

It is a further object of the invention to provide a device comprising a support for a film holder having means for positioning said holder thereon and for positioning a film in relation to said holder together with means movable toward the support for moving the film into film holding relation to the holder.

It is another object of the invention to provide a device comprising a support for a film hanger or holder, which holder or hanger has film-piercing means thereon, means for positioning said holder or hanger on said support, means for positioning a film in desired relation to said hanger and a member movable toward said support for pressing said film over said film-piercing means.

It is more specifically an object of the invention to provide a film loading device comprising a support for a film holder or hanger having spaced film piercing means thereon with film retaining shoulders, means for positioning said holder or hanger on said support, means for positioning a film in relation to said holder or hanger and a member movable toward said support having members of yielding material adapted to engage said film over said film-piercing means and press the film thereover and past said film retaining shoulder.

These and other objects and advantages of the invention will be fully set forth in the following description made in connection with the accompanying drawings in which like reference characters refer to similar parts throughout the several views and in which—

Fig. 1 is a plan view of a film loader embodying the present invention, certain parts being broken away;

Fig. 2 is a vertical section taken on line 2—2 of Fig. 1 as indicated by the arrows;

Fig. 3 is a vertical section taken on line 3—3 of Fig. 2 as indicated by the arrows;

Fig. 4 is a vertical section taken on line 4—4 of Fig. 1 as indicated by the arrows;

Fig. 5 is a vertical section taken on line 5—5 of Fig. 1 as indicated by the arrows;

Fig. 6 is a view in side elevation of the device showing the same in film-engaging position;

Fig. 7 is a vertical section taken on line 7—7 of Fig. 1;

Fig. 8 is a vertical section similar to Fig. 7 showing the film pressing member with the same engaging the film;

Fig. 9 is a plan view showing the modification;

Fig. 10 is a vertical section taken on line 10—10 of Fig. 9 as indicated by the arrows;

Fig. 11 is a vertical section taken on line 11—11 of Fig. 9 as indicated by the arrows;

Fig. 12 is a plan view showing a further modified form;

Fig. 13 is a partial plan view similar to Fig. 12 shown on an enlarged scale;

Fig. 14 is a partial view similar to Fig. 13 showing additional parts;

Fig. 15 is a vertical section taken on line 15—15 of Fig. 14 as indicated by the arrows;

Fig. 16 is a view in front elevation of a film-holder or hanger when disposed in vertical position;

Fig. 17 is a view similar to Fig. 16 showing the hanger with films thereon;

Fig. 18 is a view similar to Fig. 16 showing a different form of hanger;

Fig. 19 is a vertical section taken on line 19—19 of Fig. 18 as indicated by the arrows and shown on an enlarged scale;

Fig. 20 is a partial view similar to Fig. 18 shown on an enlarged scale; and

Fig. 21 is a view in front elevation of a different form of film holder or hanger.

Referring to the drawings, in Fig. 16 a holder or hanger for photographic films is shown comprising a frame designated generally as 25, the same being shown as made from a comparatively small rod and having parallel side portions 25a, a top supporting bar 25b and a bottom portion 25c, the latter being shown as integral with side portions 25a. Top bar 25b is provided with a bight 25d at its mid-portion so that it can be suspended on a hook or other support and said portion 25b also has projecting portions which may be carried on spaced supports. A bar 26 extends between side portions 25a, the same having lugs embracing said side portions and bar 26 is secured to side portions 25a. Bar 26 has spaced depending portions from which project forwardly pointed pins 27. The form of pin 27 is shown in Fig. 19 where it will be seen that it has a pointed conical end portion and a reduced portion in the rear of said conical portion forming a shoulder extending at right angles at the base of said conical portion. Another bar 28 similar to bar 26 extends between side portions 25a and is reversely disposed to bar 26, the same having apertured lugs embracing side portions 25a and slidable thereon so that bar 28 is movable toward and from bar 26. Bar 28 also has spaced projecting portions extending upwardly and these are equipped with the pins 27. In Fig. 17 the film holder is shown as having films F secured thereon. The films are laid over the points 27 in the desired position, bar 28 being moved to a position to accommodate the length of the film and the film is then pressed downwardly over the pins 27. The film is pierced and moves below the shoulder on each of the pins 27 and the separated parts or tangs of the film then move as nearly as possible into the plane of the film and the film is retained on pins 27. It is prevented from coming off of the pins by the said shoulder and in fact cannot be removed from the pins without further puncturing or tearing of the film.

The device of the invention has for its purpose, the rapid placing of the films on the holder or hanger and specifically onto the pins 27. Referring to Figs. 1 to 8 a device is shown comprising a supporting member 32 and while this device could be variously made, in the embodiment of the invention illustrated it is shown as in the form of a plate which may be made of wood or metal. While the shape of member 32 could be varied, it is illustrated as of general rectangular form with slightly rounded corners, and the same is shown as having at opposite sides thereof of recesses 32a and 32b illustrated as of substantially semi-circular form in plan. Member 32 has secured thereto and extending transversely thereof substantially at right angles to the sides having the recesses 32a and 32b therein, pairs of spaced members 33 formed of strips of sheet metal, such as sheet metal, having portions 33a engaging support 32 and secured thereto by spaced screws 34. Members 33 extend upwardly substantially at right angles to portions 33a and have their upper ends diverging outwardly in each pair. Layers of material 35 are disposed between the pairs of members 33, being in substantial engagement therewith and extending somewhat beyond the ends of members 33 as shown in Fig. 1. While various materials might be used, in one embodiment of the invention in practice, members 35 have been made of linoleum. In the device shown in Figs. 1 to 8 there are two pairs of members 33. Adjacent the ends of members 33 and extending at right angles thereto are pairs of angular members 37 having one side in engagement with member 32 and secured thereto by spaced screws 38. The other side 37a of each member 37 extends vertically.

Secured adjacent the rear side of member 32 are spaced brackets 39, the same having parallel sides 39a extending vertically, from which extend toward each other horizontal portions engaging member 32 and secured thereto by headed screws 40. Brackets 39 are open at their front sides but have rear walls 39b. The remote side walls 39a of brackets 39 having formed therein elongated slots 39c shown as having parallel sides and arcuate ends. A bar 42 illustrated as in the form of a tube extends between brackets 39, the same having bushings 43 adjacent its ends in which are received the inner ends of studs 44 having flattened portions 44a extending through slots 39c, said studs being bored and tapped to receive headed screws 45, the heads of which are at the outer sides of brackets 39 and engage washers 46 which in turn engage the outer sides of brackets 39. It will be seen that the studs 44 will be clamped in position by screws 45 and may be held in various positions in the side plates 39a. The bar 42 is oscillatable on studs 44 and said bar has clamped thereto between the sides 39a of each of the brackets 39 a member 48 which embraces bar 52 and is split at one side and clamped to said bar by a headed screw 49 shown as having its head countersunk in member 48. Member 48 at its front is of rectangular form and the top and sides thereof are embraced by the end of a channel member 51 secured to member 48 in any suitable manner as by welding or by screws 50. There are thus two of the channel members 51 and these extend forwardly in parallel relation and are secured at their forward ends to other members 48 similar to those already described and clamped by screws 49 to a bar 52 extending between the forward members 48 and parallel to bar 42, the same also being shown as in the form of a tube. Channel members 51 have flanges 51a at their bottoms extending toward each other and spaced plates 53 and 54 are disposed at opposite sides of said flanges. Small brackets 55 engage the bottoms of plates 54 and are secured to plates 53 and 54 and to the flanges 51a by headed screws 56. Brackets 55 have central depressed portions provided with circular apertures and members 58 have portions extending through said apertures and enlarged flange-like heads 58a disposed above the depressed portions of brackets 56 and of larger diameter than said apertures. While members 58 could be variously formed, they are illustrated as made of yielding or resilient material such as rubber. The lower portions of members 58 are preferably cylindrical and somewhat greater in diameter than portions 58a. The rear wall 39b of each bracket 39 is apertured and has secured therein a resilient block 59 similar to members 58, the same acting as a stop and adapted to be engaged by the terminal portion 60a of a bracket 60 secured to the top of member 51 by rivets or screws 61. Pins 62 are secured to the adjacent sides 39a of the brackets 39 and said pins have respectively secured thereto the tensile coiled springs 63, the other ends of which are secured to pins 64 projecting inwardly from and secured in the adjacent sides of members 51 by headed screws 65. Springs 63 tend to lift the members 51 and parts carried thereby and hold the same in the position shown in Fig. 5 with brackets 60 engaging the stop members 59. The members 51 have secured therein adjacent their front ends headed stop screws 66 adapted to engage support 32, the same being threaded into nuts 67 overlying flanges 51a and extending through washers 68 underlying said flanges, said washers being engaged by jam nuts 69 threaded on screws 66.

In operation the device will occupy the position shown in Figs. 1 and 5. When a hanger such as shown in Fig. 16 is to be loaded, it is brought to the device and laid on support 32 as shown in Fig. 1, the bottom of bar 26 between the projections thereof engaging the portions 37a of angle members 37 so that the projections on bar 26 carrying pins 27 are disposed between and at the ends of brackets 37 and a projection will engage one end of a bracket 37. In Fig. 1 some clearance is shown for clearness but in practice the hanger is pushed laterally until it is positioned against the end of one of the brackets 37. Bar 28 is then pushed along rods 25a toward bar 26 until it engages the vertical portions 37a of the brackets 37 at the other end of members 33. The film hanger or holder is disposed so that pins 27 project upwardly. The films F are now laid on the device and these are disposed between members 33 as clearly shown in Fig. 5 and will be nicely and quickly guided into position by the upper diverging sides of the pairs of members 33. The film will be engaged by the vertical portions 37a of brackets 37 adjacent bar 26 as shown in Figs. 1 and 5, and the film is now properly positioned in respect to the hanger and the pins 27 thereon. The film is supported intermediate its ends on the members 35 and its end portions overlie the pins 27. The operator now takes hold of the bar 52 and swings the same downwardly, thus moving members 51 and parts carried thereby toward support 32. The members 58 thus move downwardly and come into engagement with the top of the film with their bottom surfaces and these members 58 are positioned to overlie the pins 27. The operator presses down on bar 52 and blocks 58 press down on the top of the film and push or press it over the points 27 so that the film is pierced and moved down beneath the shoulder on said points 27. This position is shown in Fig. 8. The stop screws 66 and the studs 44 are adjusted and so positioned that when stop screws 66 engage support 32 the bottoms of members 58 are substantially in one horizontal plane extending parallel to the top of member 32. When the films have thus been pressed onto the points 27 they pass below the shoulders on said points and are thus retained on the holder. The operator then releases member 52 and the frame comprising channel members 51 is returned to its upper position by springs 63. The hanger is now lifted from support 32 with the films attached and can be disposed in the desired position for further treatment of the film.

In Figs. 9 to 11 a modified form of the invention is shown in which the device is arranged for placing four comparatively narrow films on a holder. A support is used to which are secured four pairs of plates 73 extending parallel to the sides of support 72, each of said plates having vertically extending flanges 73a at each side, which flanges curve outwardly at their terminal portions. Secured to support 32 at each end of each of the plates 73 are flanged plates 75 having horizontal portions engaging the support 32 and vertical flanges 75a extending upwardly substantially at right angles thereto. Plates 75 are somewhat shorter in length than the width of plates 73. Brackets 39 already described, are secured in spaced relation adjacent one side of support 39 as already described. The channel members 51 are pivoted in brackets 39 as already described. Blocks 59 are secured in brackets 77 having depressed central portions and being similar to brackets 55 except that they are of a length to accommodate two of the blocks 58. Brackets 77 engage plates 78 below the flanges 51a of members 51 and plates 79 overlie flanges 51a, brackets 77, plates 78 and plates 79 being secured as shown in Fig. 11 by the headed screws 80.

In operation, the frame comprising members 51 will be held in raised position as shown in Fig. 5, by the springs 63. When a hanger is to be loaded it will be brought to the device and placed on the support 32 as shown in Fig. 9. The hanger shown in Fig. 9 is also shown in Fig. 18 and it will be seen that the same has four pairs of the pins 27 on each of the bars 26 and 28. The hanger will be placed so that the projections on its bar 26 engage the ends of the plates 75. As shown in Fig. 9, the projections nearest the side bars 25a embrace the outer ends of the outer plates 75. The hanger is pushed to the right as seen in Fig. 9, until the bar 26 engages the vertical flanges 75a of plates 75 at the left as shown in Fig. 9. The hanger can thus be quickly placed on and positioned on support 32. The movable bar 28 of the hanger is now moved into engagement with the plates 75 at the right as shown in Fig. 9. The films F are now placed in position, the same being guided by and accurately positioned along their sides by the side portions 73a of plates 73. The films are positioned endwise by the vertical portions 75a of plates 75. The operator now takes hold of bar 52 and depresses the frame comprising members 51, the same swinging about the axis of bar 42. The members 58 engage the films over the pins 27 and the films are pressed downward over said pins and pass below the shoulders thereon as shown in Fig. 11. The position of the studs 44 is adjusted as stated, so that as the lower surface of members 58 engage the film, said surfaces are substantially in a horizontal plane parallel to support 32. At this time the stop screw 66 engages the support 32. After the films have been pressed onto pins 27 the operator releases bar 52 and the same is swung to its normal position by springs 63. The hanger with the films thereon can now be lifted and taken to the desired place for further treatment of the films.

In Figs. 12 to 15 a further modification is shown adapted to be used to load a film on a hanger such as shown in Fig. 21. In this hanger the bar 26 has pivoted thereon adjacent the ends thereof small arms 30. A pair of these arms are also pivoted adjacent the ends of the movable bar 28. The said bars as shown in Figs. 13 and 14 are provided with central arcuate edges 26c concentric with the pivot 31 about which arm 30 swings. Said bar also has arcuate edges 26d at each side of the arcuate edge 26c. The free ends of arms 30 are depressed as is also a narrow central portion or tongue 30a so that when said arms swing about their pivots the tongue 30a will engage one or the other of the arcuate surfaces 26d which thus act as stops. Arms 30 adjacent their free ends carry pins 27.

In Figs. 12 to 15 the support 32 is shown to which are secured the brackets 39 as already described between which extends the bar 42 having secured thereto arms 51 at the forward end of which is the bar 52. The frame comprising arms 51 is held in its upper normal position as already described by the springs 63. Plates 82 are secured to support 32, the same extending parallel to the axes of bars 42 and 52 and these plates have upstanding side portions 82a similar to the side portions 73a of plates 73 already described. The ends 82b of plates 82 are of arcuate form as clearly shown in Figs. 12, 13 and 14. Plates 84 are also secured to support 32 as by the screws 85 and have upstanding vertical flanges 84a. Plates 84 extend substantially at right angles to plates 82. A sheet 86 of material such as linoleum is disposed between plates 82 and extends to within a short distance of the horizontal flanges of plates 84. It will be noted that the ends of plates 84 extend diagonally. Secured to the channel members 51 in a manner already described, are the resilient blocks or members 87. These members are provided with heads 87a which are disposed above the lower side 88a of a clip bracket 88 similar to bracket 55, said bracket engaging a plate 89 disposed below the flanges 51a of members 51 and being secured by screws 90 which extend through said brackets, plates 89 and plates 91 which overlie the tops of flanges 51a.

In operation the hanger shown in Fig. 21 will be laid on support 32, the frame comprising members 51 being in normal raised position. The fixed top bar 26 is brought into position with the arcuate edges 26d engaging the arcuate ends 82b of the plates 82. In Figs. 13 and 14 a slight clearance is shown between said parts for clearness. Movable bar 28 is then moved against the other ends of plates 82, the arms are swung inwardly and their depressed ends engage the inner arcuate edges 26d. The arms 30 are shown in this position in Figs. 14 and 15. The film F is now placed over the hanger, the same being gauged in position by plates 82 and 84. When the film is in position the frame comprising arms 51 is swung downwardly by the operator taking hold of bar 52 and the film is pressed onto the pins 27 by the resilient members 87. As already described the points of the pins 27 press into the resilient material of members 87 without puncturing the same, said material resuming its normal position when the frame comprising arms 51 is again raised. The pivot of bar 42 and the stops for the swinging frame will be arranged as already described so that the bottom surface of members 87 in film-pressing position are substantially parallel to the support 32. The film can thus be quickly placed on the hanger and bar 52 is released allowing the swinging frame to be moved to its normal position by springs 63. The hanger with the film thereon can then be taken to the desired place. In the operation of all of the forms of the device shown the recesses 32a and 32b in member 32 facilitate the grasping or handling of the hanger.

The sheet material 35 and 86 is provided to support the films at a suitable level to be effectively engaged and pierced and this material such as metal or linoleum should have a smooth easily cleaned surface which will not scratch the film.

From the above description it will be seen that we have provided a simple and ingenious device by means of which one or more films can be easily and quickly secured to or loaded on a film holder or hanger. The films can be easily loaded onto or attached to the hanger in complete darkness and by the sense of touch alone. The loading is usually done in a dark room. The films can thus be easily and quickly handled and the hangers quickly loaded. The general film handling process is thus greatly hastened and facilitated. In one form of film treating process the films are placed in a machine such as disclosed and claimed in the pending application of Glen M. Dye, Ralph B. Maddock, Robert Sardeson and Edward H. Savela, for "Film processing machine," filed March 25, 1943, Serial No. 480,488. Film hangers or holders of the type dealt with in this application are disclosed and claimed in the application of Robert Sardeson and Edward H. Savela, filed July 22, 1942, S. N. 451,940. The device has been amply demonstrated in actual practice, found to be very successful and efficient and is being commercially made.

It will of course, be understood that various changes may be made in the form, details, arrangement and proportions of the parts without departing from the scope of applicants' invention, which generally stated, consists in a device capable of carrying out the objects above set forth, in the parts and combinations of parts disclosed and defined in the appended claims.

What is claimed is:

1. A film loading device having in combination, a support adapted to have a film hanger lie thereon said film hanger having spaced top and bottom members each having a plurality of film piercing and receiving means thereon, means upstanding from said support adapted to engage said members to position said hanger, said support having a surface adapted to have a film lie in flat position thereon and overlying said film piercing and receiving means, means for positioning films relatively to said hanger and support, a member pivoted at one side of said support and swingable downwardly toward said support, said member carrying spaced resilient means arranged to align with and overlie said film piercing means on both members of said hanger and to simultaneously press the top and bottom portions of said films respectively into holding relation with said piercing means.

2. The structure set forth in claim 1, said resilient means having film engaging surfaces and means for positioning said member so that said surfaces are in a plane substantially parallel to said support and films when said resilient means engage said films respectively.

3. A film loading device for loading films onto a hanger having spaced top and bottom members thereon each having a plurality of film piercing and receiving means for engaging respectively the top and bottom portions of films having in combination, a substantially flat support adapted to have said hanger lie thereon, means for engaging said top and bottom portions for positioning said hanger on said support, a frame pivoted at one end of said support and swingable toward and from said support and adapted to be moved toward said support by the operator, means normally holding said frame in raised position, means for guiding films into position and holding them in position relatively to said hanger and means of yielding material carried on said frame adapted to overlie said piercing and receiving means and respectively to simultaneously press the top and bottom portions of said films thereon when said frame is swung down toward said support.

4. A film loading device for loading films onto a hanger having spaced top and bottom members thereon, each having film piercing and receiving means for engaging respectively the top and bottom portions of films having in combination, a substantially flat support, a frame pivoted at one end of said support and swingable toward and from said support and adapted to be moved toward said support by the operator, means normally holding said frame in raised position and adapted to return it to raised position, means for guiding films laid on said support from above into position and holding them in position, spaced members secured to said support for positioning said hanger in proper relation to said films and spaced members of yielding resilient material carried on said frame adapted to overlie all of said piercing and receiving means on said top and bottom members respectively and to simultaneously press the top and bottom end portions of films onto said piercing means when said frame is moved toward said support.

5. A film loading device for loading films onto a film hanger having top and bottom members each provided with pointed piercing and receiving means for engaging the top and bottom portions of films respectively, having in combination, a support, means thereon for supporting films in flat horizontal position, a frame pivoted to said support and swingable toward and from said support, spaced members carried on said frame having flat film-engaging surfaces and adapted to align respectively with said film piercing and receiving means, a pivot about which said frame swings, means for adjusting the position of said pivot and adjustable stop means for said frame, said pivot and stop means being adjustable so that said film-engaging surfaces lie substantially in a horizontal plane parallel to said films and support when said frame is moved down and said surfaces moved into film engaging position.

6. A device for loading films onto a film hanger, said hanger having spaced members with film-piercing and receiving means thereon, comprising a support having a surface adapted to have said hanger lie thereon, means on said support for positioning said hanger, said support having a surface adapted to have a plurality of films lie thereon in flat condition substantially parallel to said last mentioned surface, means on said support for positioning a plurality of films, said films being placed on said support from above to be guided into and held in position in securing relation to said film-piercing and receiving means by said last mentioned means, and means movable toward said support, films and hanger for simultaneously pressing the top and bottom portions of all of said films onto said film-piercing and receiving means to secure said films to said hanger.

7. A device for loading films onto a hanger, which hanger is formed of spaced members disposed substantially in one plane, having in combination, a support having a substantially flat surface adapted to have said hanger lie thereon with said plane substantially parallel to said surface, means on said support adapted to be engaged by said hanger for positioning said hanger thereon, said support having a substantially flat surface thereon adapted to have films lie thereon in flat position with their flat sides substantially parallel to said last mentioned surface, means on said support for positioning a plurality of films thereon placed on said last mentioned surface from above, said hanger having a plurality of spaced film-piercing and receiving means upstanding therefrom which said films overlie when positioned on said last mentioned surface, and means movable toward said support after said hanger and films have been placed thereon for forcing the end portions of said films onto said film-piercing and receiving means.

8. A device for loading films onto a hanger, said hanger having spaced relatively movable parts disposed substantially in one plane, having in combination, a support having a surface adapted to have said hanger lie thereon with said plane substantially parallel to said surface, means upstanding from said support for engaging spaced parts of said hanger to position the same, said hanger having upstanding film-piercing and receiving means thereon, said support having a substantially flat surface adapted to have a film lie thereon in flat condition with its flat side substantially parallel to said last mentioned surface, means upstanding from said support for engaging the edges of said film for positioning the same in relation to said hanger with its end portions overlying said film-piercing and receiving means, and means for engaging said film at a plurality of corners thereof and pressing the same onto said film-piercing and receiving means to secure the same to said hanger.

9. A device for loading films onto a hanger, which hanger comprises a frame disposed substantially in one plane and having spaced top and bottom members each having a plurality of film-piercing and receiving means thereon, having in combination, a base member having a surface on which said hanger is adapted to lie with said plane substantially parallel to said surface, means upstanding from said base adapted to be engaged by said hanger for positioning the same, said base having a plurality of surfaces adapted to have a plurality of films lie thereon respectively in flat position with their flat sides substantially parallel to said surfaces, means for guiding said films into and holding them in position on said surfaces as they are laid thereon so that said films overlie said film-piercing and receiving means, and a frame pivoted to said base having a plurality of resilient members thereon adapted to engage said films over said film-piercing and receiving means when said frame is swung towards said base to simultaneously press all of said films onto said film-piercing and receiving means respectively.

GLEN M. DYE.
ROBERT SARDESON.
ROBERT W. ARMSTRONG.